(12) United States Patent
Sato

(10) Patent No.: US 7,406,205 B2
(45) Date of Patent: Jul. 29, 2008

(54) IMAGE PROCESSING APPARATUS AND IMAGE PROCESSING METHOD

(75) Inventor: Yutaka Sato, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 671 days.

(21) Appl. No.: 10/501,664

(22) PCT Filed: Jun. 20, 2003

(86) PCT No.: PCT/JP03/07881

§ 371 (c)(1),
(2), (4) Date: Jul. 15, 2004

(87) PCT Pub. No.: WO2004/003843

PCT Pub. Date: Jan. 8, 2004

(65) Prior Publication Data

US 2005/0117808 A1    Jun. 2, 2005

(30) Foreign Application Priority Data

Jun. 28, 2002  (JP) ............................. 2002-189475

(51) Int. Cl.
G06K 9/36  (2006.01)
G06K 9/46  (2006.01)

(52) U.S. Cl. .................................. 382/234; 382/284

(58) Field of Classification Search ................ 382/162, 382/164, 173, 232, 233, 234, 240, 250, 251, 382/284, 305; 345/600–604; 375/240.03, 375/240.19
See application file for complete search history.

(56) References Cited

U.S. PATENT DOCUMENTS

| | | | |
|---|---|---|---|
| 5,130,797 | A | 7/1992 | Murakami et al. |
| 2002/0122489 | A1 | 9/2002 | Kuniba |

FOREIGN PATENT DOCUMENTS

| | | |
|---|---|---|
| JP | 61125275 | 6/1986 |
| JP | 02224468 | 9/1990 |
| JP | 03177961 | 8/1991 |
| JP | 03250995 | 11/1991 |
| JP | 04245865 | 9/1992 |
| JP | 2000217003 | 8/2000 |
| JP | 2002176650 | 6/2002 |

Primary Examiner—Amir Alavi
(74) Attorney, Agent, or Firm—Cooper & Dunham, LLP

(57) ABSTRACT

An image processing apparatus (1) is adapted to carry out a heavy-load operation that requires a longer processing time as compared with other ordinary operations. The apparatus comprises multiple heavy-load processing units (14, 15, 16, 17) arranged in parallel with each other, a data distribution unit (13) configured to distribute image-related data to each of the heavy-load processing units, and a data synthesizing unit (18) configured to synthesize multiple data sets output from the heavy-load processing units so as to produce a sequence of heavy-load processed data that is substantially the same as one obtained if a single heavy-load processing section were employed.

10 Claims, 11 Drawing Sheets

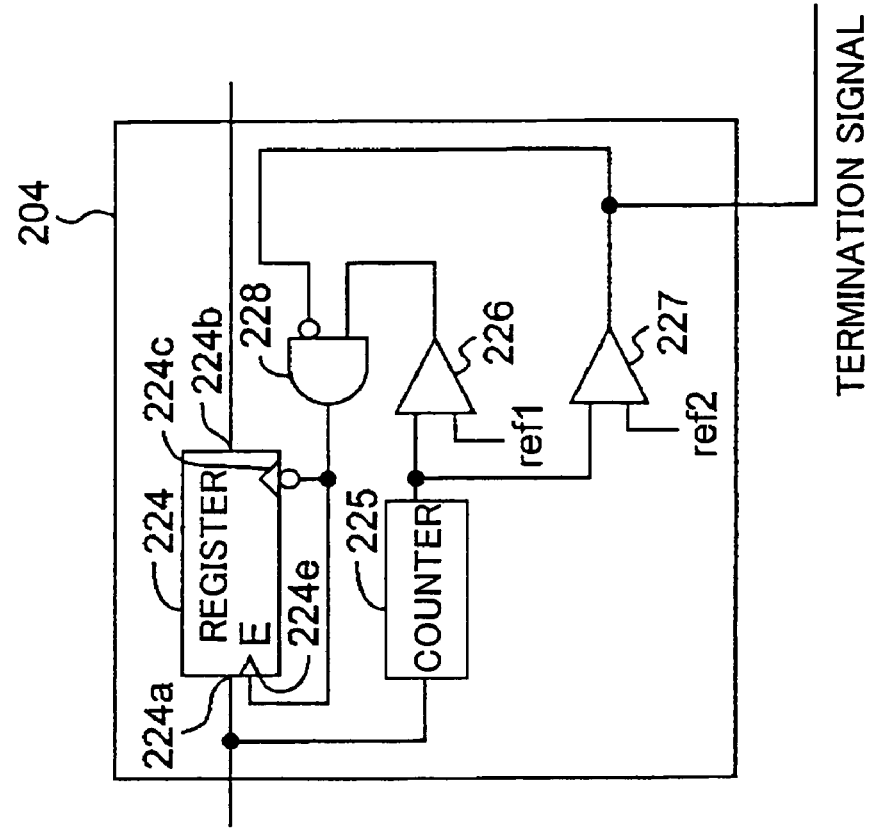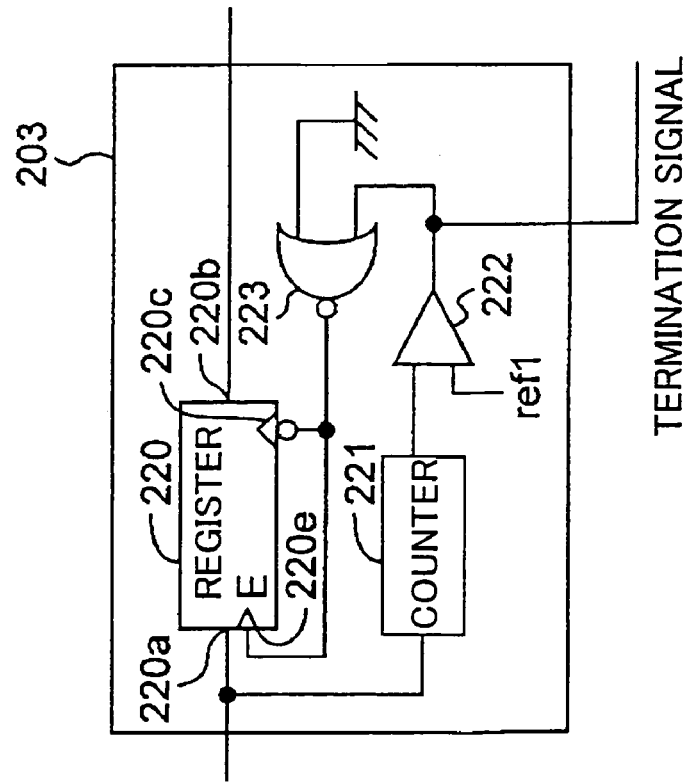
FIG.9A
FIG.9B

IMAGE PROCESSING APPARATUS AND IMAGE PROCESSING METHOD

This application is a 371 of PCT/JP03/07881 Jun. 20, 2003.

BACKGROUND OF THE INVENTION

The present invention relates to an image processing technique that includes a heavy-load processing part for carrying out a time-consuming arithmetic process as compared with other computing processes.

In general, image processing apparatuses carry out prescribed processes for image-related data. Some kinds of image processing apparatuses have a heavy-load processing part for carrying out an arithmetic process that requires longer processing time as compared with other processes. For example, while ordinary processing units process data for each image data block, the heavy-load processing part carries out arithmetic for each bit data at the same driving clock frequency.

An example of such a heavy-load image processing apparatus is a JPEG 2000 imaging processing apparatus. A JPEG 2000 image processing apparatus has a coefficient-bit modeling unit and an MQ coding unit in its heavy-load processing part.

FIG. 1 schematically illustrates the data processing structure of the conventional JPEG 2000 image processing apparatus 300. Image data are subjected to color conversion at the color conversion unit 301 and separated into luminance information Y and two color-difference components Cr and Cb. Discrete wavelet transform (DWT) unit 302 uses an irreversible transform filter to carry out discrete wavelet transform at a prescribed level, and outputs the required wavelet coefficients to the quantization unit 303, which then carries out scalar quantization.

The coefficient-bit modeling unit 304 divides the wavelet coefficients into blocks of a predetermined size in each subband, and decomposes the quantized subbands of coefficients into bit-planes beginning from the highest bit in each block. Then, the coefficient-bit modeling unit 304 carries out coefficient coding for each bit data of the bit-plane of the quantized wavelet coefficients using three types of coding paths for each bit data.

MQ coder 305 carries out binary arithmetic coding for each bit of the coefficient-coded data, and outputs the resultant code data to the code stream formation unit 306.

The code stream formation unit 306 adds coding-related information to a predetermined location of the binary-arithmetic coded data generated by the MQ coder 305 and outputs a stream of code data, which is named a code steam.

The color conversion unit 301, the discrete wavelet transform unit 302, and the quantization unit 303 deal with image data blocks, each data block consisting of, for example, 8 bits or 16 bits. In contrast, the coefficient-bit modeling unit 304 and the MQ coder 305 carry out the process for each bit of data that constitutes the image data block. Accordingly, the data quantity processed by the coefficient-bit modeling unit 304 and the MQ coder 305 is much larger than that handled in the other processing units, and longer processing time is required. To this end, the coefficient-bit modeling unit 304 and the MQ coder 305 are grouped into a heavy-load processing section A.

If 8-bit image data are transformed into 12-bit discrete wavelet coefficients through the color conversion unit 301, the discrete wavelet transform unit 302 and the quantization unit 303, then the processing rates or the driving clock frequencies of the coefficient-bit modeling unit 304 and the MQ coder 305 have to be set twelve times as large as those of other processing units in order to promptly process the data supplied from the quantization unit 303 without using a large-sized buffer memory. To greatly increase the driving clock frequency, a separate clock signal generator or a large-sized frequency increasing circuit is required.

SUMMARY OF THE INVENTION

Therefore, it is an object of the present invention to provide an image processing apparatus with a heavy-load processing part for carrying out time-consuming operations, the image processing apparatus being capable of reducing the processing time of such time-consuming operations so as to be consistent with other ordinary processing operations, without greatly raising the driving clock frequency of the heavy-load processing part.

To achieve the object, a parallel signal processor is used to carry out a heavy-load operation at multiple heavy-load processing units arranged in parallel with each other. Before the heavy-load operation, prescribed image-related data are distributed to the heavy-load operation units. After the heavy-load operation, multiple results output from the respective heavy-load processing units are combined into a set of data so that the combined data set is substantially the same as data obtained if a single heavy-load operation unit is used.

In one aspect of the invention, an image processing apparatus with a heavy-load processing part that carries out a heavy-load operation requiring a longer processing time as compared with other ordinary processing parts is provided. This image processing apparatus comprises multiple heavy-load processing units arranged in parallel with each other, a data distribution unit configured to distribute image-related data to each of the heavy-load processing units, and a data synthesizing unit configured to synthesize multiple data sets output from the heavy-load processing units so as to produce a sequence of heavy-load processed data that is substantially the same as data obtained if a single heavy-load processing unit were employed.

The data distribution unit has a memory that stores the image-related data, and the data distribution unit outputs a prescribed portion of the image-related data stored in the memory to one of the heavy-load processing units.

Alternatively, the data distribution unit distributes the image-related data directly to each of the heavy-load processing units based on the amount of a portion of the image-related data corresponding to one of the heavy-load processing units.

The data synthesizing unit stores the multiple data sets output from the respective heavy-load processing units in a second memory so that the stored data are substantially the same as data obtained if a single heavy-load processing unit were employed. In this case, when operations of all the heavy-load processing units have been completed, the data synthesizing unit reads and outputs the stored data from the second memory.

As an alternative structure, the data synthesizing unit may have multiple temporary memories, each of which is provided to store the data set output from one of said multiple heavy-load processing units. In this case, when operations of all the heavy-load processing units have been completed, the data synthesizing unit reads and outputs the data from the temporary memories so that the output data are substantially the same as data obtained if a single heavy-load processing unit were employed in the image processing apparatus.

In the image processing apparatus, the heavy-load processing units deal with the image-related data on a bit-data basis, while other ordinary processing part deals with the image-related data on a data-block basis.

By allowing the heavy-load processing units to carry out time-consuming operations in parallel with each other, the processing time for the time-consuming operations can be reduced as a while, without greatly raising the driving clock frequency of the heavy-load processing part. Consequently, the data processing time of respective processing sections can be equalized in the image processing apparatus.

BRIEF DESCRIPTION OF THE DRAWINGS

Other objects, features, and advantages of the present invention will become more apparent from the following detailed description when read in conjunction with the accompanying drawings, in which:

FIG. 9 illustrates the structure of each of the coefficient memories used in the parallel signal processing unit shown in FIG. 8;

DETAILED DESCRIPTION OF THE EMBODIMENTS

The preferred embodiments of the present invention will now be described in detail with reference to the attached drawings.

(1) Overall Structure

Figure 2:
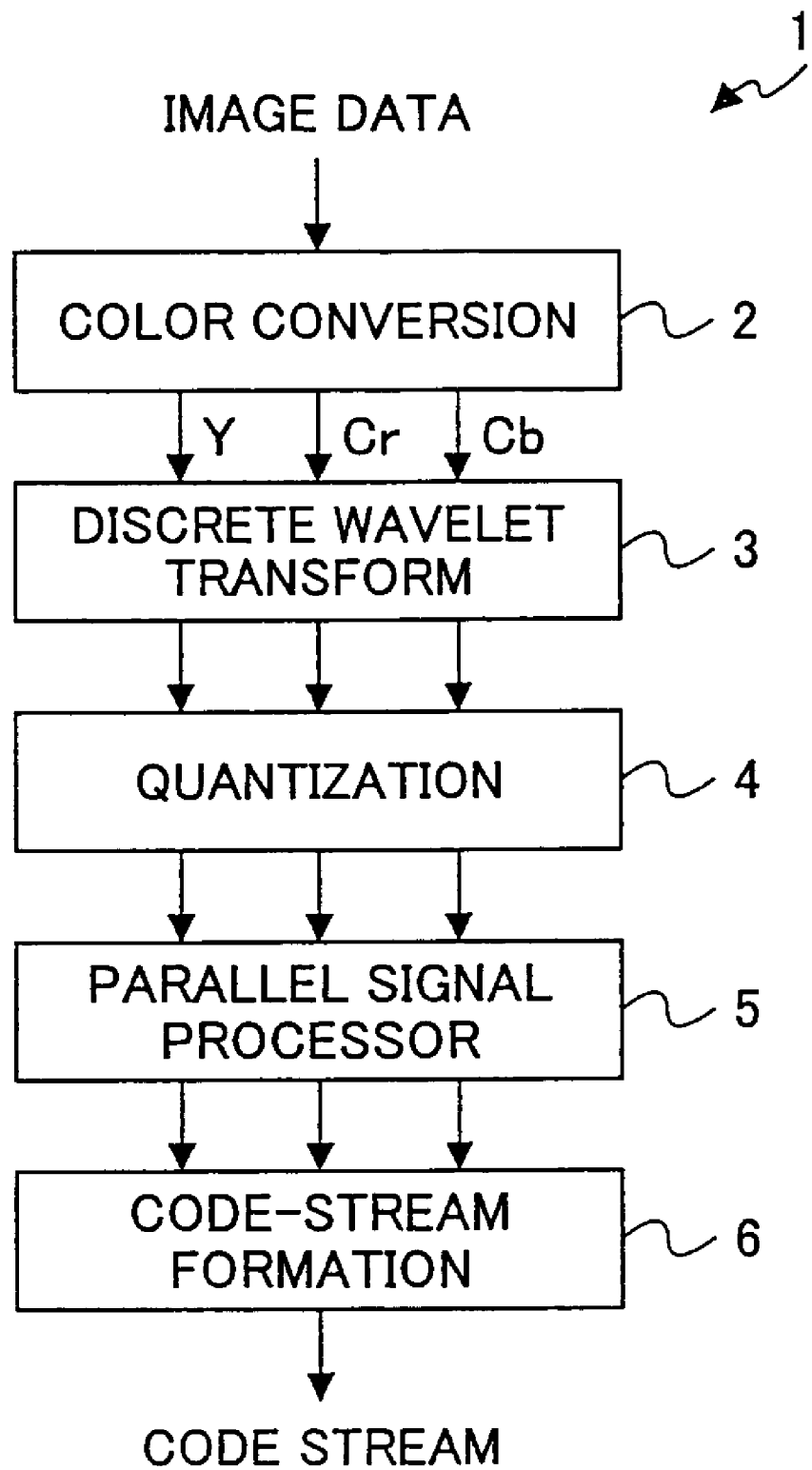
FIG. 2 is a block diagram of the data processing part of the image processing apparatus according to the present invention.

FIG. 2 illustrates a JPEG 2000 image processing apparatus 1 proposed by the present invention. The image processing apparatus 1 has a parallel signal processor 5 between the quntization unit 4 and the code stream formation unit 6.

The parallel signal processor 5 has a plurality of coefficient-bit modeling and MQ coding units, which implement heavy-load processes in parallel to each other. To this end, a series of quantized wavelet coefficients supplied from the quantization unit 4 are distributed evenly to the coefficient-bit modeling and MQ coding units. The processing results output from the coefficient-bit modeling and MQ coding units are synthesized into code data, so that the synthesized code data become substantially the same code data that could be obtained if a single unit of coefficient-bit modeling and MQ coding were used to process the quantized discrete wavelet coefficients.

This parallel processing structure is advantageous because the difference in processing time between previous-stage ordinary processing units, which deal with 8-bit image data blocks, for example, and the coefficient-bit modeling and MQ coding unit, which deals with one bit data blocks, can be absorbed without greatly increasing the clock frequency of the coefficient-bit modeling and MQ coding operation.

In FIG. 2, other processing units, that is, the color conversion unit 2, the discrete wavelet transform unit 3, the quantization unit 4, and the code stream forming unit 6 are the ordinary data processing units.

The color conversion unit 2 converts the input image data into a luminance component (Y) and two color-difference components Cr and Cb. Discrete wavelet transform unit 3 uses an irreversible transform filter to carry out level-3 discrete wavelet transform on each of the three signal components. The resultant wavelet coefficients are output to the quantization unit 4, which then carries out scalar quantization.

The parallel signal processor 5 divides the quantized wavelet coefficients of each signal component into four groups for each subband, and carries out heavy-load processes at four coefficient-bit modeling and MQ coding units in parallel. The processing results from the coefficient-bit modeling and MQ coding units are synthesized into code data, which are substantially the same as data obtained if a single coefficient-bit modeling and MQ coding unit were employed.

The code stream forming unit 6 adds coding-related information to a prescribed location of the series of code data produced by the parallel signal processing unit 5, and outputs final code data, which is named a code stream.

(2) Parallel Signal Processor

Figure 3:
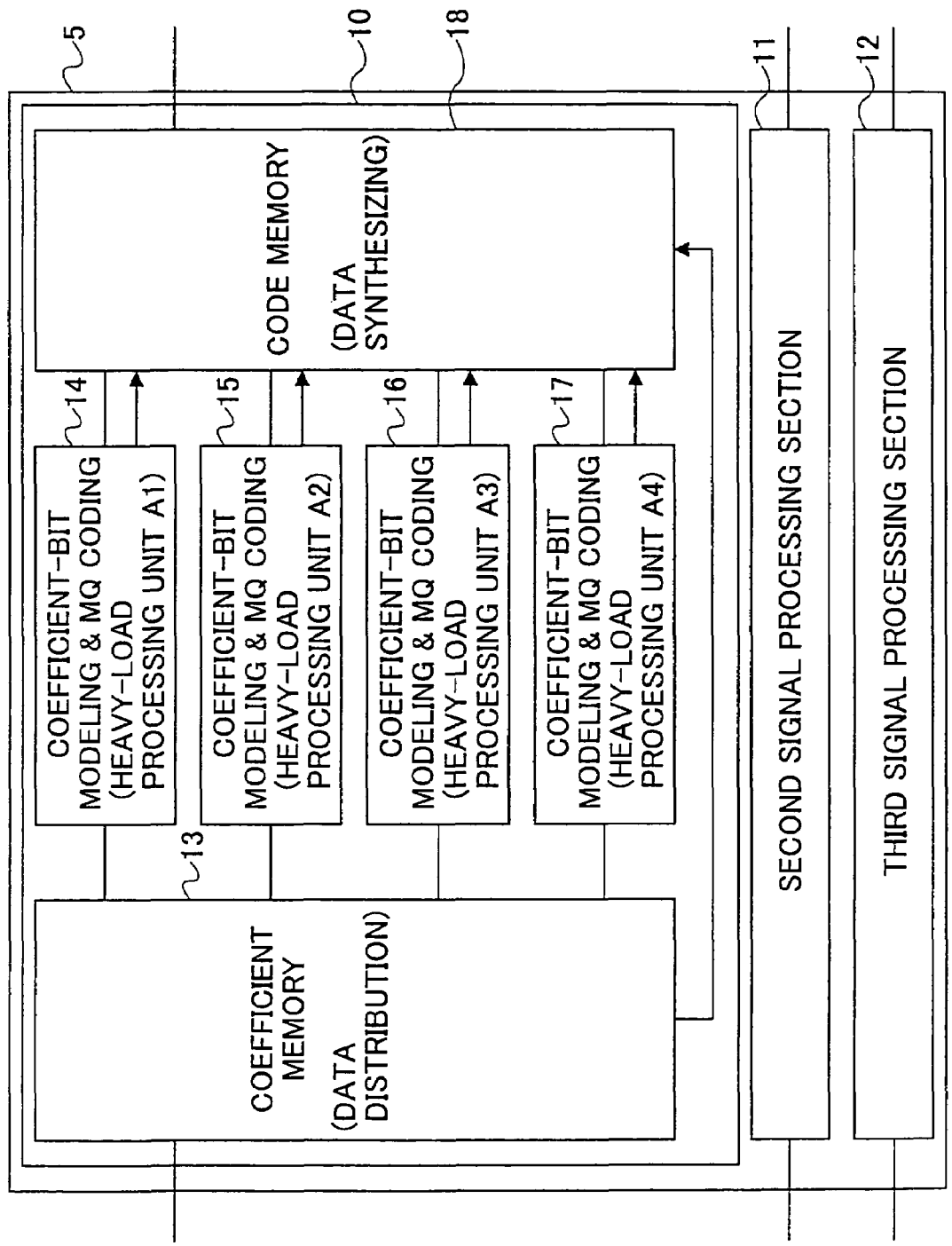
FIG. 3 illustrates the parallel signal processing unit used in the image processing apparatus shown in FIG. 2 according to the first embodiment of the invention.

FIG. 3 illustrates the structure of the parallel signal processor 5 shown in FIG. 2. The parallel signal processor 5 consists of the first, the second, and the third signal processing sections 10, 11, and 12, each of which corresponds to one of the signal components Y, Cr, and Cb. Accordingly, each of the signal processing sections 10, 11 and 12 receives one of the signal components that has been subjected to the discrete wavelet transform and quantization at the earlier stage.

Since the signal processing sections 10, 11, and 12 are similar to each other, explanation will be made only of the signal processing section 10. The signal processing section 10 has a coefficient memory 13 and four heavy-load processing units A1-A4 that implement coefficient-bit modeling and MQ coding operations in parallel with each other. These heavy-load units A1-A4 are referred to as coefficient-bit modeling and MQ coding units 14, 15, 16 and 17, respectively.

The coefficient memory 13 receives the quantized wavelet coefficients of the luminance component Y, and distributes the quantized wavelet coefficients evenly to the four coefficient-bit modeling and MQ coding units 14-17 for each subband. The coefficient memory 13 functions as a data distributor. The detailed structure and the operation of the coefficient memory 13 will be described below.

Each of the coefficient-bit modeling and MQ coding units 14-17 decomposes the quantized wavelet coefficients into bit planes for each data block in accordance with the JPEG 2000 rules, and carries out coefficient coding for each bit of data in each of the bit planes using three types of coding paths. Then, binary arithmetic coding is carried out as the MQ coding process in each of the coefficient-bit modeling and MQ coding units 14-17. The amount of data processed in the coefficient-bit modeling and MQ coding units 14-17 is large, as compared with other ordinary data processing units.

The code memory 18 receives and synthesizes the code data output from the respective coefficient-bit modeling and MQ coding units 14-17 into a single set of code data, so that the synthesized code data become substantially the same as data obtained if a single coefficient-bit modeling and MQ coding unit were used. In other words, the code memory 18 functions as a data synthesizer. The synthesized code data become a final output of the parallel signal processor 5.

(3) Coefficient Memory

Figure 4:
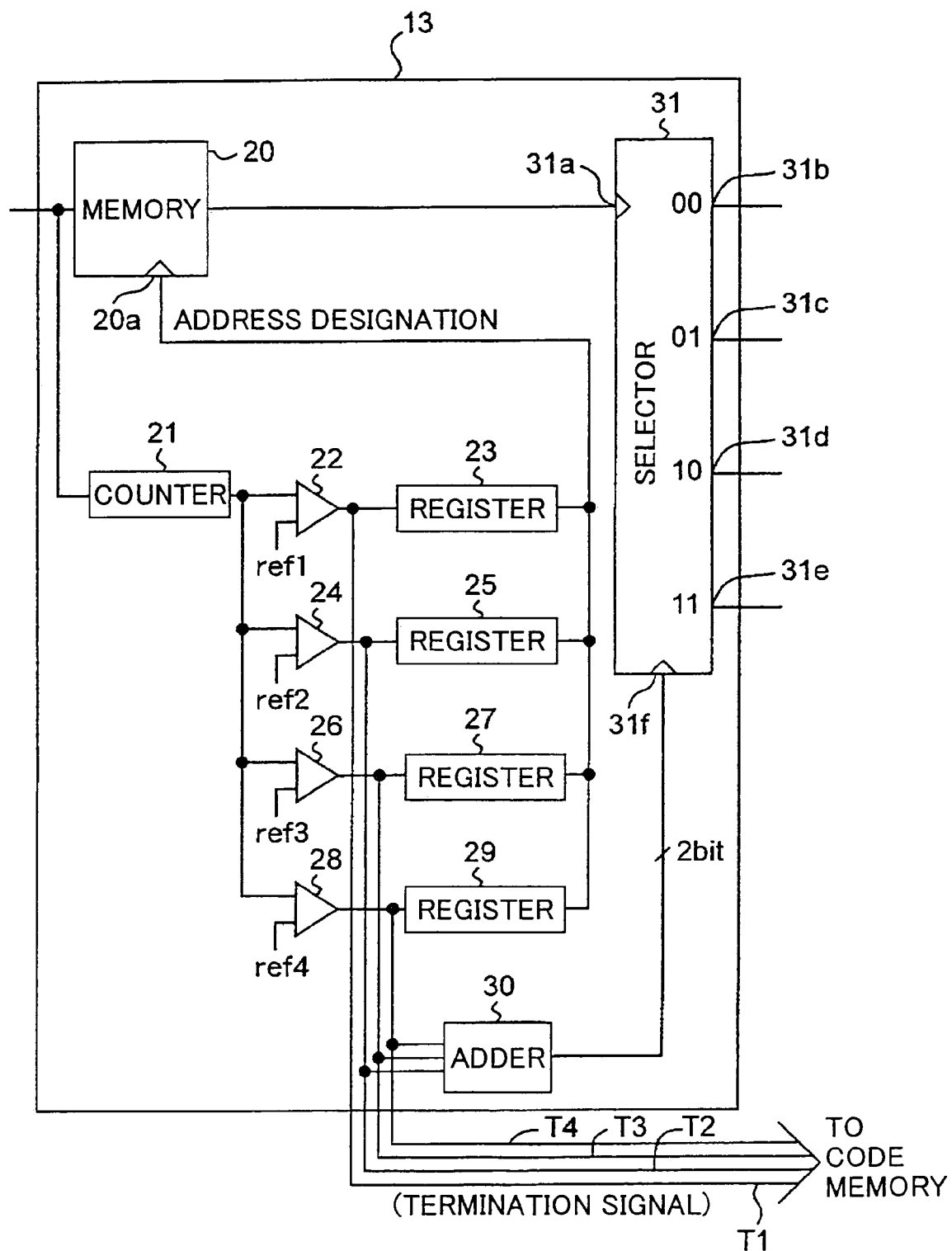
FIG. 4 illustrates the structures of the coefficient memory used in the parallel signal processing unit shown in FIG. 3.

FIG. 4 illustrates the structure of the coefficient memory 13 used in the first signal processing section 10 shown in FIG. 3. The coefficient memory 13 stores the quantized wavelet coefficients in the memory 20, and then successively reads the data from the memory 20, while grouping the data into four groups. The first group consists of subbands of 3LL, 3LH, 3HL, 3HH, 2LH, 2HL, and 2HH. The second group is a subband group of 1LH, the third group is a subband group of 1HL, and the fourth group is a subband group of 1HH. The data of the first group are output from the output terminal 31*a* of the selector 31 to the coefficient-bit modeling and MQ coding unit 14. The data of the second group are output from the output terminal 31*b* of the selector 31 to the coefficient-bit modeling and MQ coding unit 15. The data of the third group are output from the output terminal 31*c* of the selector 31 to the coefficient-bit modeling and MQ coding unit 16. The data of the fourth group are output from the output terminal 31*d* of the selector 31 to the coefficient-bit modeling and MQ coding unit 17.

To be more precise, the quantized wavelet coefficients output from the quantization unit 4 are supplied to the memory 20 and the counter 21. The counter 21 counts the data amount of the wavelet coefficients, and supplies the counter value to one input terminal of each of the four comparators 22, 24, 26, and 28.

The comparator 22 has a reference value ref1, which represents the data amount of all the subbands of 3LL, 3LH, 3HL, 3HH, 2LH, 2HL, and 2HH. If the counter value is greater than the reference value ref1, a High level signal is output from the comparator 22 to the data demand terminal of the register 23. The register 23 stores the first address designation data, which is required to read the data about the wavelet coefficients of the subbands of 3LL, 3LH, 3HL, 3HH, 2LH, 2HL, and 2HH stored in the memory 20. Upon receiving the High level signal from the comparator 22, the register 23 outputs the first address designation data to the address designation terminal of the memory 20*a*. In response to the first address designation data, the memory 20 outputs the wavelet coefficients of the subbands of 3LL, 3LH, 3HL, 3HH, 2LH, 2HL, and 2HH to the selector 31.

The comparator 24 has a reference value ref2, which is obtained by adding the data amount of the 1LH subband to the first reference value ref1. If the counter value is greater than the reference value ref2, a High level signal is output from the comparator 24 to the data demand terminal of the register 25. The register 25 stores the second address designation data, and is required to read the data about the wavelet coefficients of the 1LH subband stored in the memory 20. Upon receiving the High level signal from the comparator 24, the register 25 outputs the second address designation data to the address designation terminal of the memory 20*a*. In response to the second address designation data, the memory 20 outputs the wavelet coefficients of the 1LH subband to the selector 31.

The comparator 26 has a reference value ref3, which is obtained by adding the data amount of the 1HL subband to the second reference value ref2. If the counter value is greater than the reference value ref3, a High level signal is output from the comparator 26 to the data demand terminal of the register 27. The register 27 stores the third address designation data, and is required to read the data about the wavelet coefficients of the 1HL subband stored in the memory 20. Upon receiving the High level signal from the comparator 26, the register 27 outputs the third address designation data to the address designation terminal of the memory 20*a*. In response to the third address designation data, the memory 20 outputs the wavelet coefficients of the 1HL subband to the selector 31.

The comparator 28 has a reference value ref4, which is obtained by adding the data amount of the 1HH subband to the third reference value ref3. If the counter value is greater than the reference value ref4, a High level signal is output from the comparator 28 to the data demand terminal of the register 29. The register 29 stores the fourth address designation data, and is required to read the data about the wavelet coefficients of the 1HH subband stored in the memory 20. Upon receiving the High level signal from the comparator 28, the register 29 outputs the fourth address designation data to the address designation terminal of the memory 20*a*. In response to the fourth address designation data, the memory 20 outputs the wavelet coefficients of the 1HH subband to the selector 31.

The signals output from the comparators 22, 24, 26, and 28 are supplied to the code memory 18. These output signals are referred to as termination signals T1, T2, T3, and T4, respectively. How these termination signals are used will be described below in conjunction with the code memory 18.

The output signals from the comparators 24, 26, and 28 are supplied to the adder 30. The adder 30 determines the number of High level signals among the three input signals. The determined number is represented as a 2-bit selection signal, which is connected to the selection signal input terminal 31*f* of the selector 31.

Comparator 24 does not output the High level signal unless the quantized wavelet coefficients of the 1LH subband are stored in the memory 20. Similarly, the comparators 26 and 28 do not output the High level signals unless the 1HL subband wavelet coefficients and the 1HH subband wavelet coefficients, respectively, are stored in the memory 20. In other words, the adder 30 outputs a selection signal "00" to the selection terminal 31*f*, which means that there is no High level signal included in the three signals from the comparators 24, 26, and 28, until the 1LH subband wavelet coefficients have been stored in the memory 20.

As long as the selector 31 receives the "00" selection signal from the adder 30, the selector 31 allocates the data received at the input terminal 31*a* to the output terminal 31*b*, which is connected to the coefficient-bit modeling and MQ coding unit 14. Consequently, under the control of the "00" signal, the selector 31 outputs the data of the wavelet coefficients of the subbands of 3LL, 3LH, 3HL, 3HH, 2LH, 2HL, and 2HH through the output terminal 31*b*.

When the 1LH subband of wavelet coefficients has been stored in the memory 20, the comparator 24 outputs a High level signal, and therefore, the adder 30 output a selection signal "01" to the selection signal input terminal 31*f* of the selector 31. Under the "01" selection signal, the selector 31 outputs the data of the 1LH subband of wavelet coefficients through the output terminal 31*c* to the coefficient-bit modeling and MQ coding unit 15.

If the 1HL subband of wavelet coefficients is stored in the memory 20, then the adder 30 outputs a "10" selection signal, and the selector 31 allocates the data received at the input terminal 31a to the output terminal 31d. Consequently, the data of the 1HL subband wavelet coefficients are output from the coefficient memory 13 through the terminal 31d to the coefficient-bit modeling and MQ coding unit 16. Similarly, if the 1HH subband of wavelet coefficients is stored in the memory 20, the adder 30 outputs a "11" selection signal, and the selector 31 allocates the data from the memory 20 to the output terminal 31e. Consequently, the data of the 1HH subband wavelet coefficients are output from the coefficient memory 13 through the terminal 31d to the coefficient-bit modeling and MQ coding unit 17.

(4) Code Memory

Figure 5:
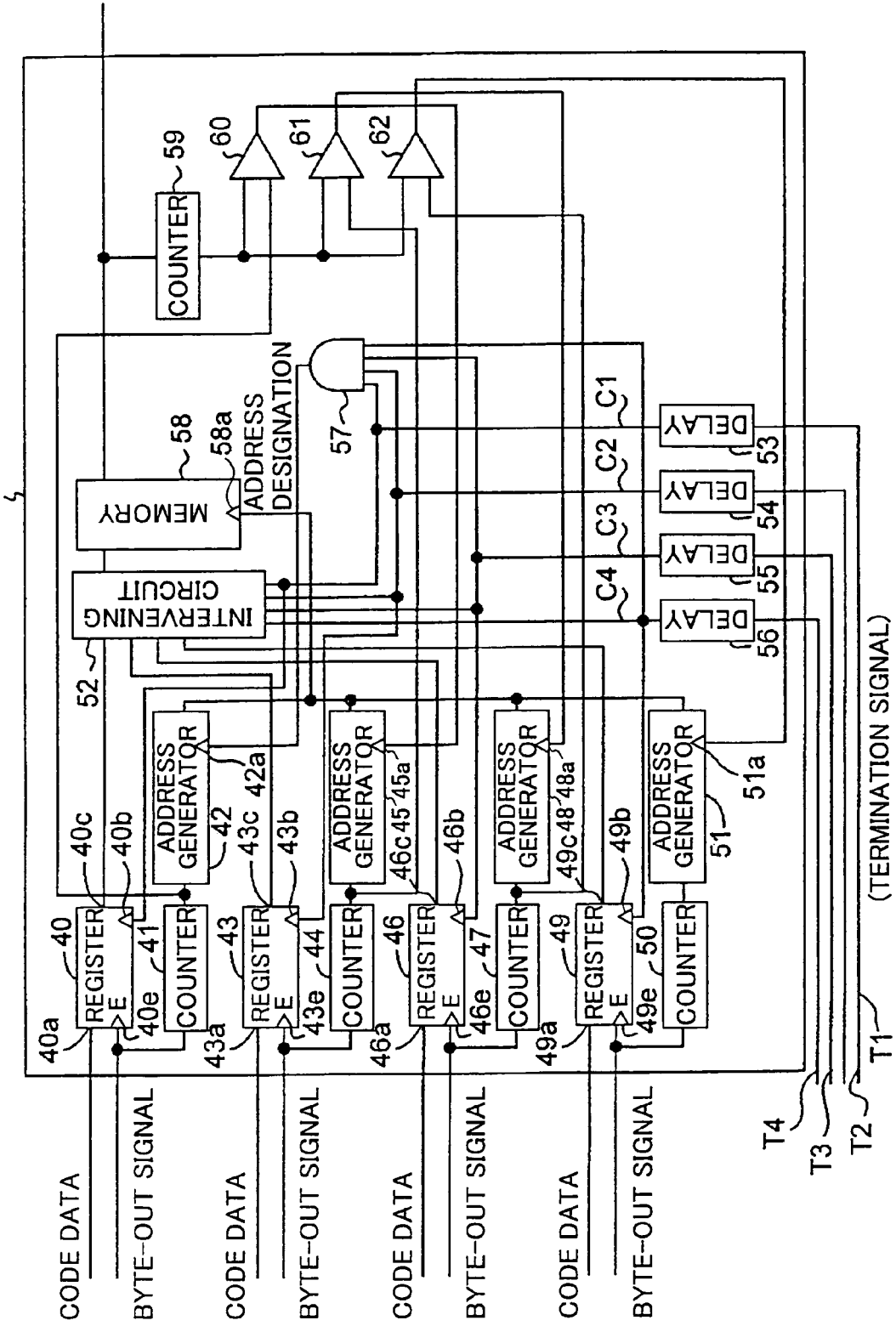
FIG. 5 illustrates the structure of the code memory used in the parallel signal processing unit shown in FIG. 3.

FIG. 5 illustrates the structure of the code memory 18. The code memory 18 stores the code data supplied from the coefficient-bit modeling and MQ coding units 14-17 in the memory 58. Then, it reads the code data of the first, the second, the third, and the fourth groups in this order from the memory 58, and outputs a set of data that is substantially the same as a data set obtained when a single coefficient-bit modeling and MQ coding unit is used.

In the detailed structure, the output from the coefficient-bit modeling and MQ coding units 14, 15, 16, and 17 are supplied to the registers 40, 43, 46, and 49, respectively. Since the amounts of code data produced by the coefficient-bit modeling and MQ coding units 14-17 are not constant, counters 41, 44, 47, and 50 count the amount of the code data output from the respective coefficient-bit modeling and MQ coding units 14-17 based on byte-out signals. The byte-out signal becomes high level every time code data are output from the coefficient-bit modeling and MQ coding units 14-17 in accordance with JPEG 2000 rules.

The code memory 18 determines that the MQ coding has been completed in each of the coefficient-bit modeling and MQ coding units 14-17 when a prescribed delay time has passed since each of the termination signals T1-T4 supplied from the coefficient memory 13 turns to the High level. The delay time is specified from the processing capacity of the associated coefficient-bit modeling and MQ coding unit. To be more precise, the termination signals T1, T2, T3, and T4 output from the comparators 22, 24, 26, and 28 are delayed at the delay circuits 53, 54, 55, and 56, respectively, by a prescribed time, and then output from the delay circuits 53-56 as coding process finish signals C1, C2, C3, and C4. Each of the coding process finish signals C1-C4 is supplied to the data request terminal of one of the registers 40, 43, 46, 49, to the intervening circuit 52, and to the AND gate 57. As has been described above, the delay circuits 53-56 delay the associated termination signals T1-T4 by a prescribed time specified from the process capacities of the coefficient-bit modeling and MQ coding units 14-17.

First, explanation will be made regarding the first group code data output from the coefficient-bit modeling and MQ coding unit 14, that is, the code data of the wavelet coefficients of the subbands of 3LL, 3LH, 3HL, 3HH, 2LH, 2HL, and 2HH. The register 40 receives code data and the byte-out signal from the coefficient-bit modeling and MQ coding unit 14 at the input terminal 40a and the enable terminal 40e, respectively. The register 40 stores the code data during the period for which the High level byte-out signal is input to the enable terminal 40e. The counter 41 counts the number of the High level byte-out signals. The address generator 42 generates an address signal required to read the code data out of the memory 58, based on the counter value of the counter 41. The start address for writing each group of code data in the memory 58 is determined in advance. The end address of the code data written in the memory 58 is determined by the address generator 42 by adding the data amount specified from the counter value of the counter 41 to the start address.

The same applies to the second, the third, and the fourth group of code data, that is, the MQ-coded wavelet coefficients of subbands of 1LH, 1HL, and 1HH, respectively. The registers 43, 46, and 49 store the code data input through the input terminals 43a, 46a, and 49a, respectively, as long as the byte-out signals input to the enable terminals 43e, 46e, and 49e are at the High level. The counters 44, 47, and 50 count the amounts of code data based on the High-level byte-out signals. The address generators 45, 48, and 51 generate address signals required to read the code data written in the memory 58. The start address of each group of code data is determined in advance. Accordingly, the address generators 45, 48, and 51 determine the end addresses of the code data of the associated group by adding the data amounts specified from the counter values of the counters 44, 47, and 50 to the corresponding start addresses.

In response to the coding process finish signals C1 through C4 appearing at the data request terminals 40b, 43b, 46b, and 49b, the registers 40, 43, 46, and 49 start outputting the stored code data to the memory 58 through the output terminals 40c, 43c, 46c, and 49c, respectively. An intervening circuit 52 is inserted between the memory 58 and the respective registers 40, 43, 46, and 49 in order to adjust the order of data output to the memory 58 when two or more registers simultaneously output the stored code data. The intervening circuit 52 will be described in detail below.

The AND gate 57 determines that the code data of the respective groups have been written in the memory 58 when all the coding process finish signals C1 through C4 have changed to the High level. Upon the determination, the AND gate 57 outputs a High level signal to the address data output request terminal 42a of the address generator 42. In response to the High-level signal at the address data output request terminal 42a, the address generator 42 outputs an address signal to the address designation terminal 58a of the memory 58 to cause the code data of the first subband group (i.e., the subbands of 3LL, 3LH, 3HL, 3HH, 2LH, 2HL, and 2HH) to be read out of the memory 58. The address signal represents the reading start address and the reading end address.

The code data read out of the memory 58 are output external as they are, and at the same time, supplied to the counter 59. The counter 59 counts the data amount, and supplies the counter value to one of the input terminals of each of the comparators 60, 61, and 62.

The other input terminal of the comparator 60 receives the counter value of the counter 41. When all the code data of the first subband group have been read out of the memory 58, the comparator 60 outputs a High level signal to the output request terminal 45a of the address generator 45, which is furnished for the second subband group. In response to the High level signal appearing at the output request terminal 45a, the address generator 45 outputs an address signal to the address designation terminal 58a of the memory 58 to cause the code data of the second subband group (that is, the code data of the 1LH subband) to be read out of the memory 58.

The counter value of the counter 44 is connected to the other input terminal of the comparator 61. When all the code data of the second subband group have been read out of the memory 58, the comparator 61 outputs a High level signal to the output request terminal 48a of the address generator 48, which is furnished for the third subband group. In response to the High level signal appearing at the output request terminal 48a, the address generator 48 outputs an address signal to the address designation terminal 58a of the memory 58 to cause the code data of the third subband group (that is, the code data of the 1HL subband) to be read out of the memory 58.

The counter value of the counter 47 is connected to the other input terminal of the comparator 62. When all the code data of the third subband group have been read out of the memory 58, the comparator 62 outputs a High level signal to the output request terminal 51a of the address generator 51, which is furnished for the fourth subband group. In response to the High level signal appearing at the output request terminal 51a, the address generator 51 outputs an address signal to the address designation terminal 58a of the memory 58 to cause the code data of the fourth subband group (that is, the code data of the 1HH subband) to be read out of the memory 58.

(5) Intervening Circuit

Figure 6:
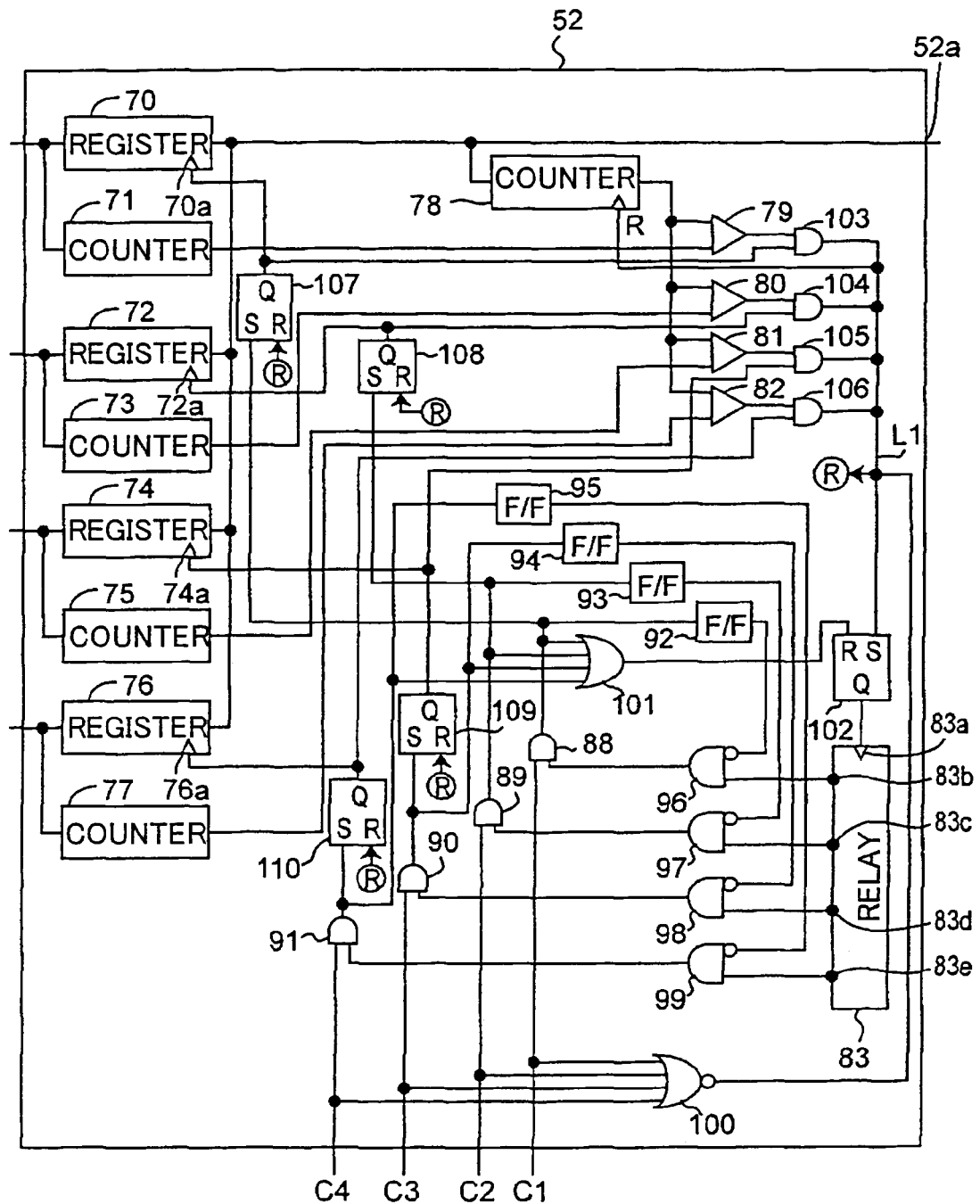
FIG. 6 illustrates the structure of the intervening circuit used in the code memory shown in FIG. 5.

FIG. 6 illustrates the structure of the intervening circuit 52 used in the code memory 18 shown in FIG. 5. The code data of the respective subband groups that have been subjected to the coefficient-bit modeling and MQ coding are connected to the intervening circuit 52 in parallel to each other. The intervening circuit 52 successively and repeatedly examines whether the coefficient-bit modeling and MQ coding processes have been completed in the first through fourth subband groups in this order. The intervening circuit 52 allows the code data of a subband group that has already been subjected to the coefficient-bit modeling and MQ coding processes to be output to memory 58, prior to the other subband groups. If the coefficient-bit modeling and MQ coding processes have been completed for another subband group during the output operation for the previously completed subband group, then the code data are stored in the associated register, which is one of the registers 70, 72, 74, and 76 until the previously processed code data are all output to the memory 58.

As to the detailed structure, the registers 70, 72, 74, and 76 are FIFO-type register memories, and they output the data in order of storage, in response to High-level signals supplied to the data output request terminals 70a, 72a, 74a, and 76a, respectively. The outputs of the resisters 70, 72, 74, and 76 are connected to the output line 52a of the intervening circuit 52, and at the same time, they are input to the counter 78. The counters 71, 73, 75, and 77 count the amounts of data input to the registers 70, 72, 74, and 76, respectively.

Each of the four coding process finish signals C1, C2, C3, and C4 is connected to one of the AND gates 88, 89, 90, and 91 through one input terminal. These signals C1 through C4 are also connected to the input terminals of the NOR gate 100. The output of the NOR gate 100 is connected to the set terminal S of the RS flip-flop 102. If all of the four coding process finish signals C1 through C4 are at the Low level, the NOR gate 100 outputs a High-level signal. If any one of the four signals C1 through C4 turns to the High level, the NOR gate 100 maintains its output signal at the Low level.

The relay circuit 83 outputs a pulse signal, which discretely becomes a high level, through the output terminals 83b, 83c, 83d, and 83e repeatedly and successively in this order, as long a High level signal is input to the set terminal 83a. Each of the output terminals 83b, 83c, 83d, and 83e is connected to one of the input terminals of the AND gates 96, 97, 98, and 99, respectively. The other input terminals of the AND gates 96, 97, 98, and 99 receive the output data from the flip-flops 92, 93, 94, and 95, respectively. The outputs of the AND gates 96, 97, 98, and 99 are connected to the other input terminals of AND gates 88, 89, 90, and 91, respectively.

The output of the AND gate 88 is connected to one of the input terminals of 4-input OR gate 101, to the input terminal of flip-flop 92, and to the set terminal S of the RS flip-flop 107. The output terminal Q of the RS flip-flop 107 is connected to the data output request terminal 70a of the register 70 and one of the input terminals of the 2-input AND gate 103.

Similarly, the output of the AND gate 89 is connected to the second input terminal of 4-input OR gate 101, to the input terminal of flip-flop 93, and to the set terminal S of the RS flip-flop 108. The output terminal Q of the RS flip-flop 108 is connected to the data output request terminal 72a of the register 72 and one of the input terminals of the 2-input AND gate 104.

The output of the AND gate 90 is connected to the third input terminal of 4-input OR gate 101, to the input terminal of flip-flop 94, and to the set terminal S of the RS flip-flop 109. The output terminal Q of the RS flip-flop 109 is connected to the data output request terminal 74a of the register 74 and one of the input terminals of the 2-input AND gate 105.

The output of the AND gate 91 is connected to the fourth input terminal of 4-input OR gate 101, to the input terminal of flip-flop 95, and to the set terminal S of the RS flip-flop 110. The output terminal Q of the RS flip-flop 110 is connected to the data output request terminal 76a of the register 76 and one of the input terminals of the 2-input AND gate 106.

The output terminal Q of the 4-input OR gate 101 is connected to the reset terminal R of the RS flip-flop 102. The outputs of the AND gates 103, 104, 105, and 106 are connected to line L1, which is then connected to the set terminal S of the RS flip-flop 102, to the reset terminals R of the RS flip-flops 107, 108, 109, and 110, and to the reset terminal R of the counter 78.

The counter value of the counter 78 is supplied to one of the input terminals of each of comparators 79, 80, 81, and 82. The counter values of counters 71, 73, 75, and 77 are supplied to the other input terminals of the comparators 79, 80, 81, and 82, respectively. The outputs of the comparators 79, 80, 81, and 82 are connected to the other input terminals of the above-described AND gates 103, 104, 105, and 106, respectively.

If all of the four coding process finish signals C1 through C4 are at the Low level, the AND gates 88, 89, 90, and 91 allow the input signals C1, C2, C3, and C4 to pass through the gates.

In this state, if one of the four coding process finish signals C1 through C4, for example, signal C2 turns to the High level, then flip-flop 93 and the RS flip-flop 108 are set. Besides, the output of the NOR gate 100 connected to the set terminal S of the RS flip-flop 102 turns to the Low level. The output of OR gate 101 turns to the High level, which resets the RS flip-flop 102, and consequently, stops the operation of the relay circuit 83.

Upon setting the flip-flop 93, the output of the AND gate 97 becomes LOW constantly. As a result, the outputs of the AND gate 89 and OR gate 101 turn from High to Low. Upon setting the RS flip-flop 108, the signal levels of the data output request terminal 72a of the register 72 and one input terminal of the AND gate 104 turn to the High level. Accordingly, the code data of the second subband group (i.e., the code data of 1LH subband) stored in the register 72 are output.

The counter 78 counts the amount of data output from the register 72, and outputs the counter value to the comparators 79, 80, 81, and 82. The comparator 80 outputs a High-level signal, which is connected to one input terminal of the AND gate 104, when the counter value of the counter 78 is equal to the counter value of the counter 73. This situation means that the amount of data equivalent to the counter value of the counter 73 has been output from the register 72. Since a High-level signal is input to the other input terminal of the AND gate 104, the High-level signal output from the comparator 80 passes through the AND gate 104, and is input to the reset terminal R of the counter 78 and the set terminal S of the RS flip-flop 102. Accordingly, the counter 78 is reset. Since the RS flip-flop 102 is set in response to the High-level signal, the relay circuit 83 resumes operations, and outputs pulse signals successively through the output terminals 83b, 83c, 83d, and 83e.

Suppose that coding process finish signals C3 and C4 turn to the High level during the output operation of the register 72 for outputting the 1LH subband code data to the memory 58. Even if the coding process finish signal C2 is at the High level, the output level of the AND gate 89 is maintained at Low, without being switched to the High level, because the flip-flop 93 has been set in the above-described operation. Since the relay circuit 83 outputs a High-level pulse signal successively through the output terminals 83d and 83e, the coding process finish signal C3 passes through the AND gate 90 earlier, which causes the output of the OR gate 101 to turn to the High level. The high-level signal supplied from the OR gate 101 resets the RS flip-flop 102 to stop the operation of the relay circuit 83. Accordingly, the coding process finish signal C4 is prevented from passing through the AND gate 91 simultaneously with the coding process finish signal C3 passing through the AND gate 90.

The coding process finish signal C3 that has passed through the AND gate 90 sets the flip-flop 94 and the RS flip-flop 109. Upon setting the flip-flop 94, the output of the AND gate 90 is maintained at a Low level. Consequently, the outputs from the AND gate 90 and OR gate 101 turn to the Low level from the High level. Upon setting the RS flip-flop 109, the signal levels of the data output request terminal 74a of the register 74 and one input terminal of the AND gate 105 turn to the High level. Consequently, the third group (the 1HL subband) code data are output from the register 74.

The counter 78 counts the amount of data output from the register 74, and supplies the counter value to the comparators 79-82. The comparator 81 outputs a High-level signal when the same amount of data as that represented by the counter value has been output. Since a High level signal is supplied to one input terminal of the AND gate 105, the High level signal output from the comparator 81 is connected to the reset terminal R of the counter 78 and to the set terminal S of the RS flip-flop 102. Accordingly, the counter 78 is reset. Upon setting the RS flip-flop 102, the relay circuit 83 starts implementing operations to output pulse signals through the output terminals 83b, 83c, 83d, and 83e, successively.

In the subsequent process, the same intervening operations are repeated.

(6) Processing Result

Figure 1:
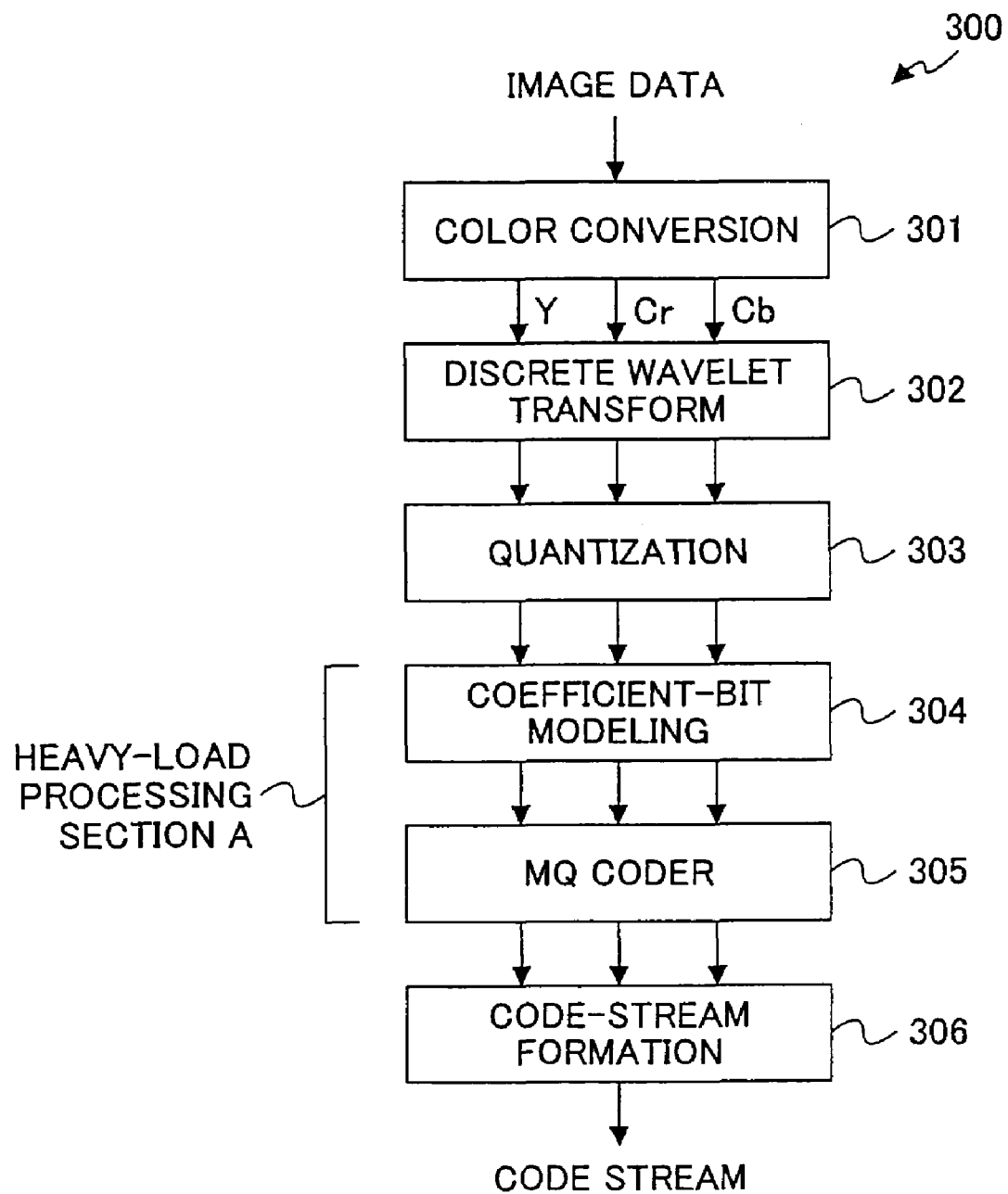
FIG. 1 is a block diagram of the data processing part of a conventional JPEG 2000 image processing apparatus.
Figure 7:
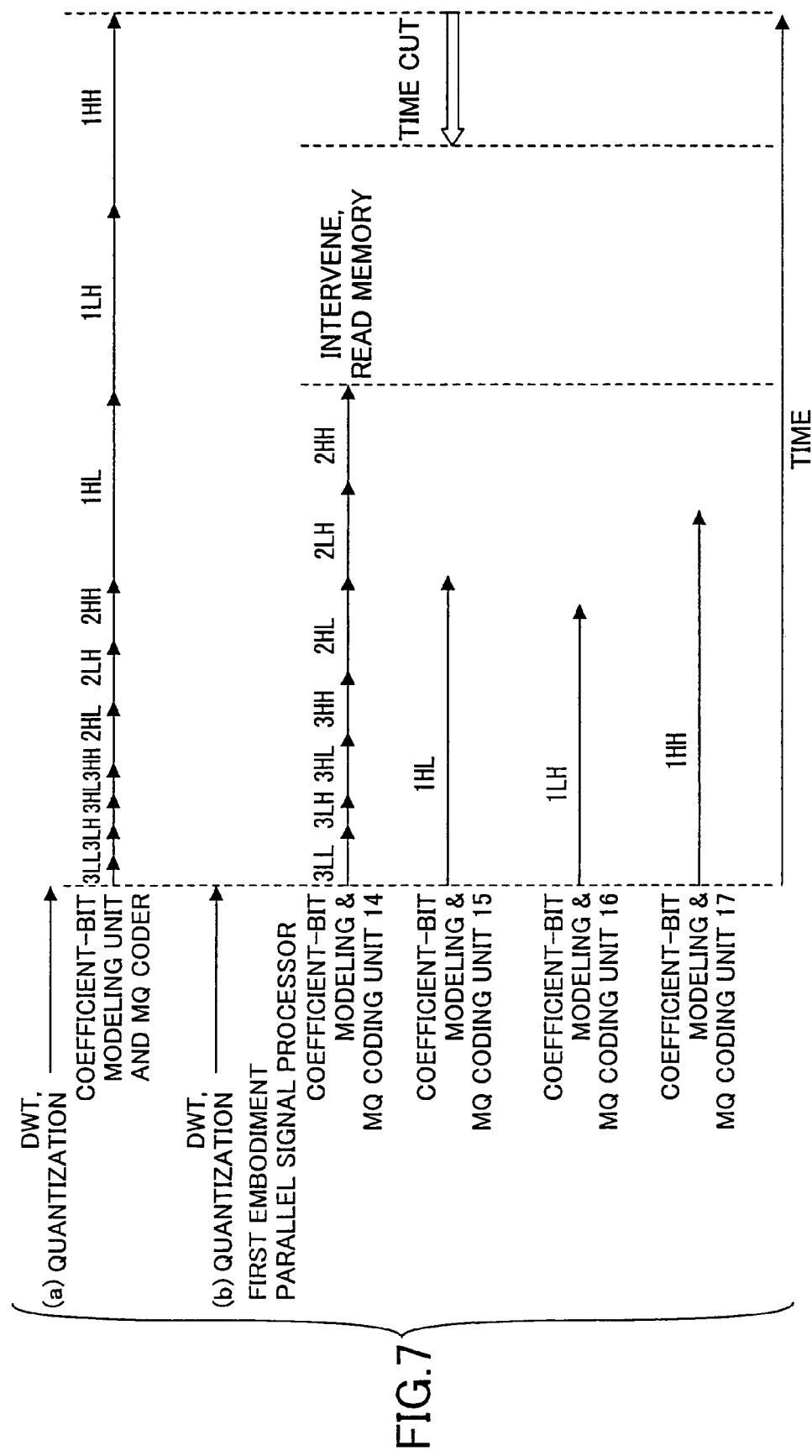
FIG. 7 illustrates the processing speed of the heavy-load processing part of the image processing apparatus of the present invention, in comparison with that of the conventional image processing apparatus.

FIG. 7 illustrates time required to carry out the heavy-load process using the parallel signal processor 5, in comparison with the conventional technique shown in FIG. 1, in which the each subband of quantized wavelet coefficients output from the quantization unit 4 are subjected to the coefficient modeling and MQ coding in conformity with the JPEG 2000 format without using parallel processing. From the comparison result, it is understood that even if the intervening time and the data readout time from each memory are added to the parallel operation, the total time required for the coefficient modeling and the MQ coding can be shortened, as compared with conventional technique. By introducing the parallel signal processor 5, the time difference between data block processing carried out by the color conversion unit 2, discrete wavelet transform unit 3, and qunatization unit 4, and bit data processing carried out by the coefficient modeling and MQ coding units can be reduced.

(7) Second Embodiment of the Invention

In the image processing apparatus 1 according to the first embodiment, the parallel signal processor 5 requires an intervening circuit 52; however, the same effect can be achieved without using the intervening circuit. In the second embodiment, the image processing apparatus employs a parallel signal processor 5' that does not use the intervening circuit. The other structures of the imaging processing apparatus are the same as those in the first embodiment. Accordingly, explanation will be made only of the parallel signal processor 5'. The same elements as those in the first embodiments are denoted by the same numerical references.

Figure 8:
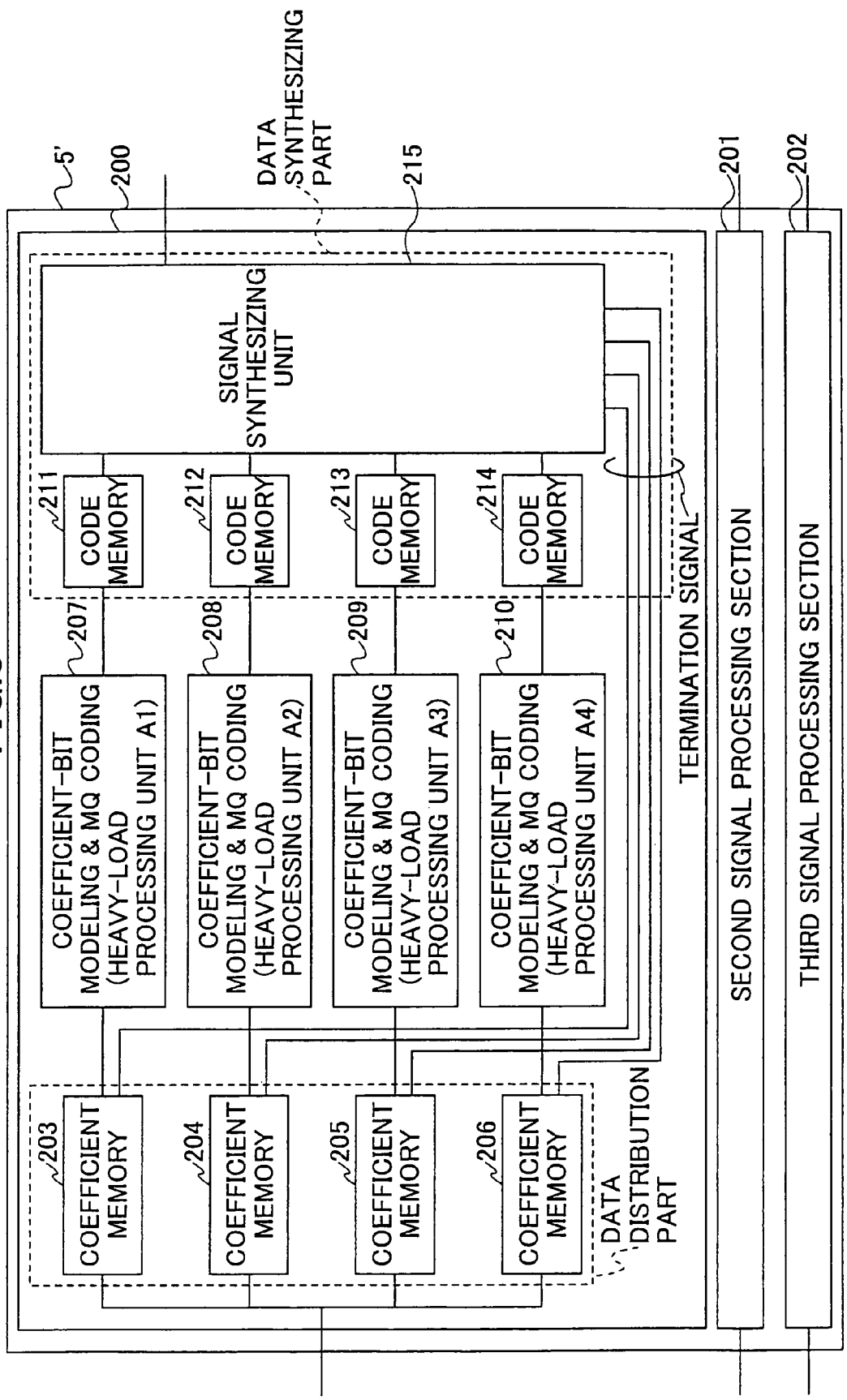
FIG. 8 illustrates the structure of the parallel signal processing unit according to the second embodiment of the invention.

FIG. 8 is a block diagram of the parallel signal processor 5' according to the second embodiment of the invention. The parallel signal processor 5' has the first signal processing section 200, the second signal processing section 201, and the third signal processing section 202, the configurations of which are the same as each other. The first through third signal processing sections 200-202 receive quantized wavelet coefficients corresponding to the luminance component (Y) and two color-difference components Cr and Cb, respectively, which are obtained through the color conversion unit 2, the discrete wavelet transform unit 3, and the quantization unit 4.

Since the three signal processing sections are substantially the same, explanation will be made only of the first signal processing section 200. The first signal processing section 200 processes the quantized wavelet coefficients of the luminance component Y. It has four coefficient memories 203-206. Coefficient memory 203 extracts the first-group quantized wavelet coefficients, that is, the quantized wavelet coefficients of subbands 3LL, 3LH, 3HL, 3HH, 2LH, 2HL, and 2HH, from the input wavelet coefficients of the luminance component Y. The coefficient memory 203 supplies the extracted subbands of wavelet coefficients directly to the coefficient modeling and MQ coding unit 207, unlike the first embodiment using a memory 20. Similarly, coefficient memories 204, 205, and 206 extract the second-group (i.e., the 1LH subband), the third-group (i.e., the 1HL subband), and the fourth-group (i.e., the 1HH subband) wavelet coefficients, respectively, from the quantized wavelet coefficients of the luminance component Y. They also supply the extracted subbands of wavelet coefficients directly to the associated coefficient modeling and MQ coding units 208-210, respectively, without using intermediate memories. The combination of these four coefficient memories 203-206 functions as a data distribution part for distributing the quantized data to the coefficient modeling and MQ coding units 207-210 of the next stage.

Each of the coefficient modeling and MQ coding units 207-210 decomposes the associated subband of wavelet coefficients into bit planes for each data block, and carries out coefficient coding to each bit plain through three types of coding paths on the bit data basis, in conformity with the JPEG 2000 rules. After the coefficient coding, each group of wavelet coefficients is subjected to binary arithmetic coding as the MQ coding process. Then, the coefficient modeling and MQ coding units 207-210 output the code data to the associated code memories 211-214, respectively. Since the amount of data to be processed in the coefficient modeling and MQ coding unit 207-210 is relatively large, as compared with other processing units, they are referred to as heavy-load processing units A1-A4, as indicated in the parentheses.

The code memories 211-214 and a signal synthesizing unit 215 cause the code data supplied from the coefficient modeling and MQ coding units 207-210 to be stored in the individual registers, and to be output successively from the registers so that the resultant code sequence is the same as data obtained if a single coefficient modeling and MQ coding unit were used. The combination of the code memories 211-214 and the signal synthesizing unit 215 functions as a data synthesizing part that produces and outputs composite data from the code data supplied from the coefficient modeling and MQ coding units 207-210, so that the composite data become data that could be obtained when using a single coefficient modeling and MQ coding unit. The detailed structures of the code memories 211-214 and the signal synthesizing-unit 215 will be described below.

(8) Coefficient Memory

FIG. 9A and FIG. 9B illustrate the structures of the coefficient memories 203 and 204, respectively. The coefficient memories 205 and 206 are basically the same as the coefficient memory 204, and the differences will be explained below.

The quantized wavelet coefficients input to the coefficient memory 203 are connected to the input terminal 220a of the register 220 and to the counter 221. The output level of the NOR gate 223 is at a High level at first, and this High-level signal is supplied to the enable terminal 220e of the register 220, and at the same time, the inverted signal of this High-level signal is connected to the data readout request terminal 220c of the register 220. Since the signal supplied to the enable terminal of the register 220 is at the High level, the register 220 stores the input data from the beginning.

The counter 221 counts the data amount of the input wavelet coefficients, and supplies the counter value to one of the input terminals of the comparator 222. The other input terminal of the comparator 222 receives a reference value ref1 that represents the data amount of the first-group wavelet coefficients (that is, the wavelet coefficients of subbands of 3LL, 3LH, 3HL, 3HH, 2LH, 2HL, and 2HH). When the amount of data input to the coefficient memory 203 reaches the reference data amount of the first-group wavelet coefficients, the comparator 222 outputs a High-level signal. This High-level signal is connected to one of the input terminals of the NOR gate 223, and at the same time, it is supplied as a termination signal T1 to the signal synthesizing unit 215. The other input terminal of the NOR gate 223 receives a Low-level signal. Accordingly, the NOR gate 223 switches its output signal from the High level to the Low level in response to the change of the input signal from Low to High supplied from the comparator 222. Since the signal supplied to the enable terminal 220e of the register 220 turns to the Low level, the data writing operation to the register 20 is stopped. In addition, since the signal input to the data readout request terminal 220c of the resister 220 turns to the High level, the data stored in the register 220 are output.

In the coefficient memory 204, the quantized wavelet coefficients input to the coefficient memory 204 are connected to the data input terminal 224a of the register 224 and to the counter 225. The output signal of the AND gate 228 is at a Low level at the beginning. This means that a Low-level signal is supplied to the enable terminal 224e of the register 224 during the period of receiving the first-group wavelet coefficients. Accordingly, data are not written into the register 224 until the first-group wavelet coefficients have been written.

The counter 225 counts the amount of data input to the coefficient memory 204, and supplies the counter value to the comparators 226 and 227. The comparator 226 receives the counter value at one of the input terminal, and a reference value ref1 at the other input terminal. As has been described above, the reference value ref1 represents the data amount of the first-group wavelet coefficients. When the received counter value reaches the reference value ref1, the comparator 226 outputs a High-level signal. This High-level output signal is connected to one of the input terminals of the AND gate 228. To the other input terminal of the AND gate 228 is connected an inverted signal of the output from the comparator 227. The comparator 227 receives the counter value at one of the input terminals, and a reference value ref2 at the other input terminal. When the counter value reaches ref2, the comparator 227 outputs a High-level signal as a termination signal T2 to the signal synthesizing unit 215. This termination signal is also inverted and the inverted signal is connected to the other input terminal of the AND gate 228.

The AND gate 228 supplies a High-level signal to the enable terminal 224e of the register 224 only when the second-group (i.e., the 1LH subband of) wavelet coefficients are being input to the coefficient memory 204. The AND gate 228 simultaneously supplies an inverted signal of this High-level signal to the data readout request terminal 224c of the register 224 during this period. In other words, the coefficient memory 204 allows data writing to the register 224 only when the second-group wavelet coefficients are being input. After the data writing is finished, the data written in the register 224 is output from the output terminal 224b.

The coefficient memories 205 and 206 have basically the same structure as the coefficient memory 204. The difference between the coefficient memory 204 and the coefficient memories 205 and 206 is the reference values supplied to the comparators 226 and 227. In the coefficient memory 205, the comparator 226 receives the reference value ref2 at one of the input terminals, and the comparator 227 receives the reverence value ref3, which is the summation of the reference value ref2 and the data amount of the wavelet coefficients of the 1HL subband, at one of the input terminals. In this arrangement, the comparator 227 outputs a High-level termination signal T3 when the counter value (i.e., the input data amount) reaches the reference value ref3.

Similarly, in the coefficient memory 206, the comparator 226 receives the reference value ref3 at one of the input terminals, and the comparator 227 receives the reverence value ref4, which is the summation of the reference value ref3 and the data amount of the wavelet coefficients of the 1HH subband, at one of the input terminals. In this arrangement, the comparator 227 outputs a High-level termination signal T4 when the counter value (i.e., the input data amount) reaches the reference value ref4.

(9) Code Memories and Signal Synthesizing Unit

Figure 10:
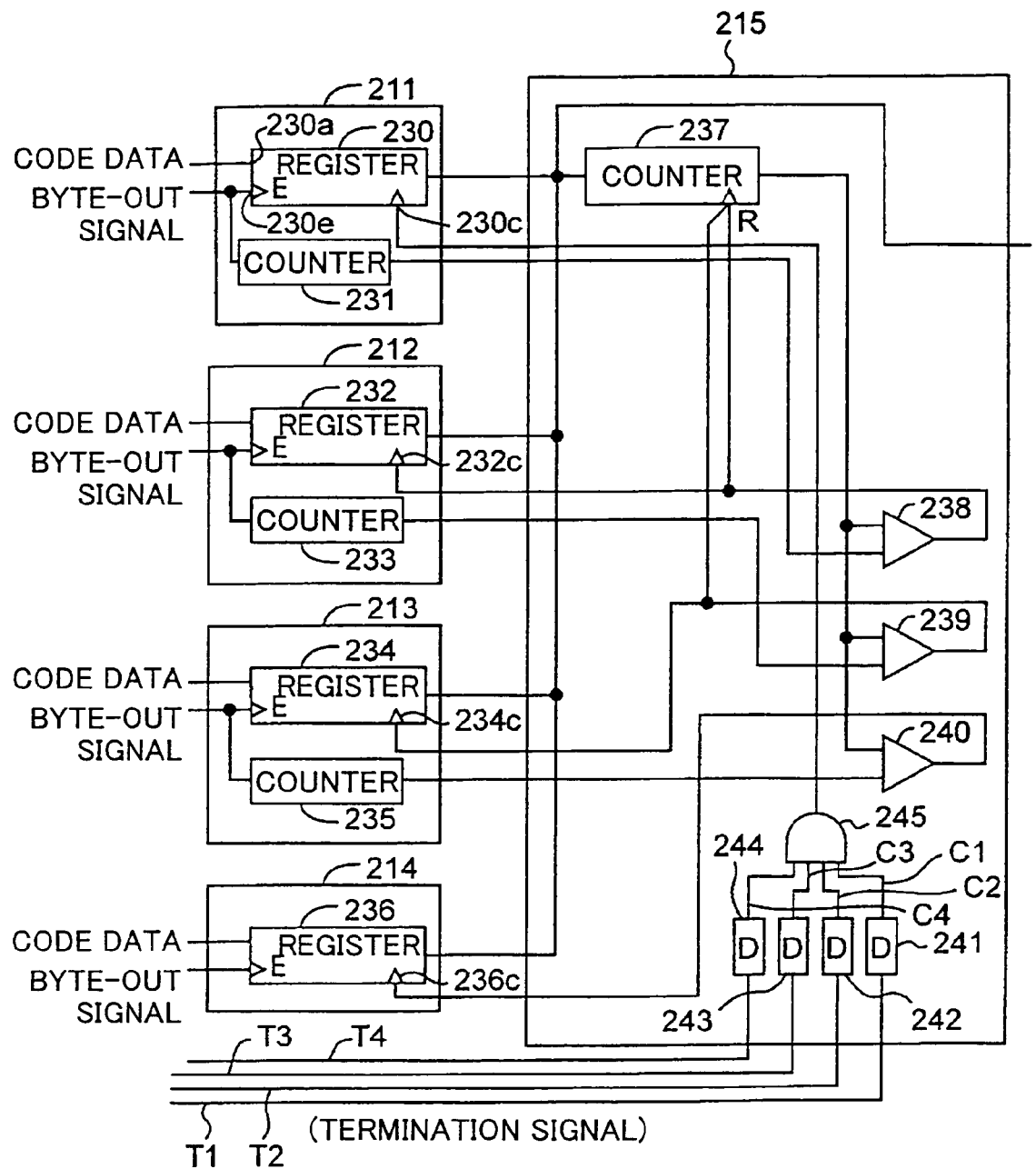
FIG. 10 illustrates the structures of the signal synthesizing unit and multiple code memories connected to the signal synthesizing unit.

FIG. 10 illustrates the structures of the code memories 211-214 and the signal synthesizing unit 215. The code memories 211, 212, and 213 have the same structure, in which the amount of the input code data is counted and the counted value is used to switch the data output of the register. Since the amounts of code data produced by the coefficient modeling and MQ coding units 207-210 in conformity with the JPEG 2000 format are not constant, the code memories 211, 212, and 213 cause the associated counters 231, 233, and 235 to count the amounts of the corresponding code data using byte-out signals that are output together with the code data from the coefficient modeling and MQ coding units 207, 208, and 109, respectively.

In the code memory 211, the code data supplied from the coefficient modeling and MQ coding unit 207 are input to the register 230 through the data input terminal 230a. Byte signals, which are output from the coefficient modeling and MQ coding unit 207 together with the code data, are also input to the register 230 through the enable terminal 230e. The byte-out signals are also input to the counter 231. Under this structure, the register 230 stores the input code data as long as it receives byte-out signals.

Similarly, code data and the byte-out signals are supplied to the code memories 212 and 213 from the coefficient modeling and MQ coding units 208 and 209, respectively. The registers 232 and 234 of the code memories 212 and 213 store the supplied code data as long as the byte-out signals are being input. Each of the counters 233 and 235 counts the number of the associated byte-out signals.

Concerning the code memory 214, since it does not requires the information about the stored data amount, only a register 236 is provided, without using a counter. The code memory 214 stores the code data when the byte-out signals are being input.

The signal synthesizing unit 215 delays the termination signals T1 through T4 output from the coefficient memories 203 through 206 by a processing time required by the coefficient modeling and MQ coding units 207 through 210, respectively, and produces coding process finish signals C1 through C4. When all of the signals C1 through C4 turn to the High level, the signal synthesizing unit 215 recognizes that all the subbands of wavelet coefficients have been subjected to the coefficient modeling and MQ coding process. Accordingly, the signal synthesizing unit 215 successively reads the code data from the registers of the code memories 211, 212, 213, and 214 in this order, and outputs a sequence of code data externally.

To be more precise, the termination signals T1, T2, T3, and T4 are input to the delay circuits 241, 242, 243, and 244, respectively, and the delayed signals are supplied as the coding process finish signals C1, C2, C3, and C4 to the 4-input AND gate 245. Each of the delay circuits 241 through 244 delays one of the termination signals T1 through T4 by a processing time required in the associated one of the coefficient modeling and MQ coding units 207 through 210.

When all the coding process finish signals C1 through C4 turn to the High level, the AND gate 245 outputs a high-level signal, which is connected to the reset terminal R of the counter 237 and to the data readout request terminal 230c of the register 230. This High-level signal resets the counter 237, and causes the register 230 to output the first-group code data of the subbands 3LL, 3LH, 3HL, 3HH, 2LH, 2HL, and 2HH to the signal synthesizing unit 215. The counter 237 of the signal synthesizing unit 215 counts the amount of the code data supplied from the code memory 211. The counter value is connected to one of the input terminals of the comparator 238. To the other input terminal of the comparator is connected the counter value of the counter 231 of the code memory 211.

When the amount of data received from the register 230 reaches the counter value of the counter 231, the comparator 238 outputs a High-level signal which is connected to the reset terminal R of the counter 237 and the data request terminal 232c of the register 232 in the code memory 212. This High-level signal resets the counter 237, and causes the register 232 to output the second-group code data, that is, the 1LH subband of code data, to the signal synthesizing unit 215. The counter 372 counts the amount of code data supplied from the register 232, and supplies the counter value to one of the input terminals of the comparator 239. To the other input terminal of the comparator 239 is connected the counter value of the counter 233 of the code memory 212.

When the amount of code data supplied from the register 232 reaches the counter value of the counter 233, the comparator 239 outputs a High-level signal, which is connected to the reset terminal R of the counter 237 and the data request terminal 234c of the register 234 of the code memory 213. This High-level signal resets the counter 237, and causes the register 234 to output the third-group code data (i.e., the 1HL subband of code data) to the signal synthesizing unit 215. The code data supplied from the register 234 is counted by the counter 237 in the signal synthesizing unit 215. The counter value of the counter 237 is connected to one of the input terminals of the comparator 240. The other input terminal of the comparator 240 is connected the counter value of the counter 235 of the code memory 213.

When the amount of code data supplied from the register 234 reaches the counter value of the counter 235, the comparator 240 outputs a High-level signal, which is connected to the data request terminal 236c of the register 236 of the code memory 214. In response to this High-level signal, the register 236 starts outputting the fourth-group code data (i.e., the 1HH subband of code data) to the signal synthesizing unit 215.

The signal synthesizing unit 215 then produces and outputs a sequence of code data by synthesizing the first group through fourth group code data in this order.

(10) Processing Result

Figure 11:
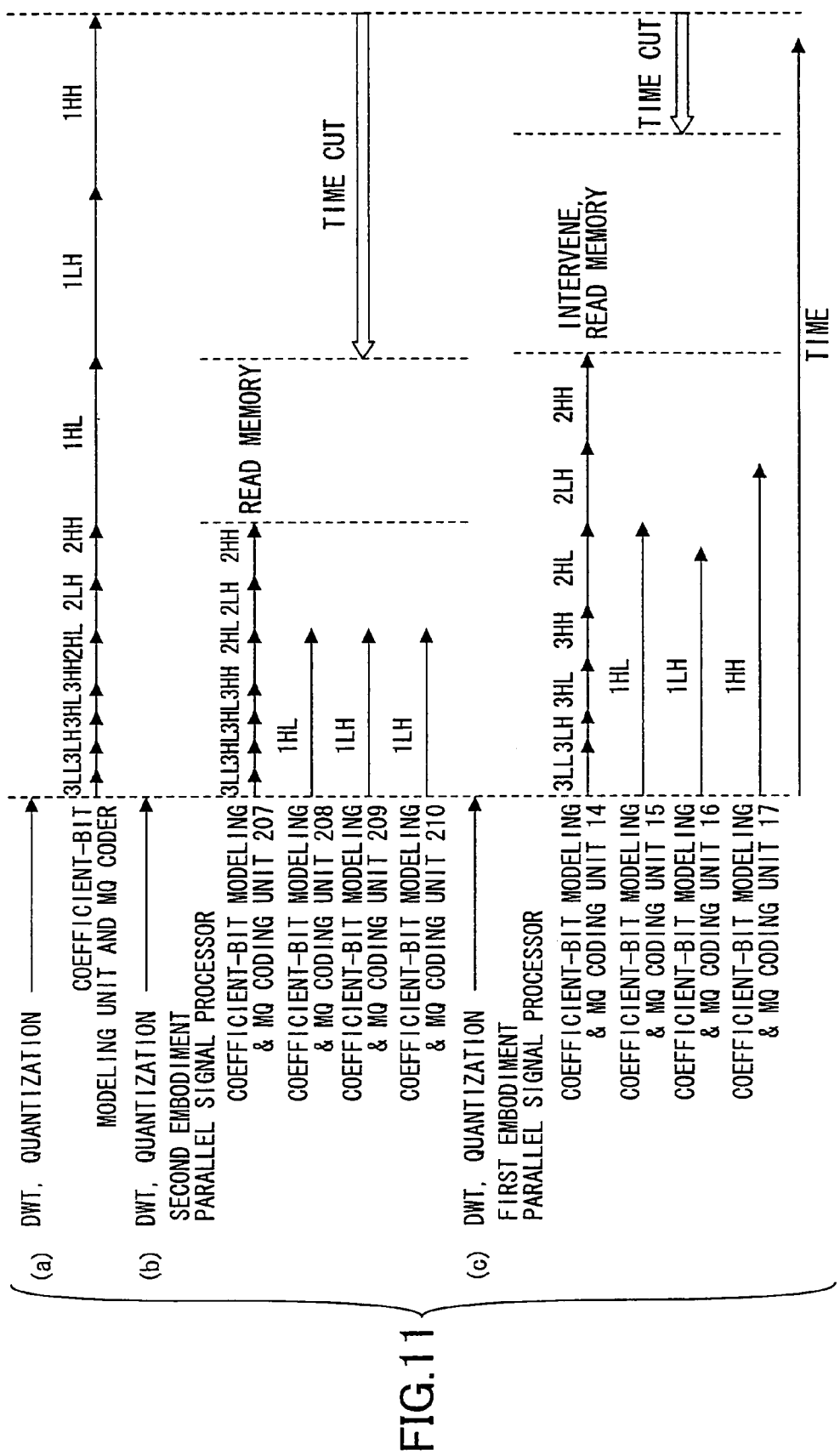
FIG. 11 illustrates the processing speed of the heavy-load processing part of the image processing apparatus of the second embodiment, in comparison with the first embodiment and with the conventional image processing apparatus.

FIG. 11 illustrates how the processing time is reduced using the parallel signal processor 5', in comparison with the signal processor 5 of the first embodiment and with the conventional technique shown in FIG. 1 in which the quantized wavelet coefficients supplied from the quantization unit 4 are subjected to the coefficient modeling process and the MQ coding process as they are.

The parallel signal processor 5' of the second embodiment is advantageous, as compared with the parallel signal processor 5 of the first embodiment, because it does not require the intervening operation carried out by the intervening circuit 52 of the parallel signal processor 5. The arrangement of the second embodiment can further reduce the gap between the processing time required for the data-block based operations carried out by the color conversion unit 2, the discrete wavelet transform unit 3, and the quantization unit 4 and the processing time required for bit-data based operations carried out for coefficient modeling and MQ coding.

As has been described above, a parallel signal processor in which multiple heavy-load processing units are arranged in parallel to each other is introduced to an image processing apparatus. The parallel signal processor can improve the processing speed of the heavy-load part of the image processing process up to multiple times as fast as the conventional technique. Consequently, the total processing time of the heavy-load operations can be reduced so as to match with the processing time of other ordinary processing units.

The data supplied to the parallel signal processor may be stored in the memory, and then distributed to the multiple heavy-load processing units. All the data requiring the heavy-load process are divided into multiple groups and distributed in the respective heavy-load processing units, each of which treats a greatly reduced amount of data. Consequently, the total processing time of the heavy-load process can be reduced to a fraction of the conventional technique.

Alternatively, the data supplied to the parallel signal processor may be distributed directly to the respective heavy-load processing units based on the amount of the input data. This arrangement allows almost real-time data distribution, and the heavy-load processing time can be further reduced.

Accordingly, adjustment of the processing time between the heavy-load processing part and the ordinary processing part can be facilitated.

The data synthesizing unit stores the multiple groups of code data having been subjected to the heavy-load operations in the memory so that the stored data are substantially the same as data obtained if a single heavy-load processing unit were employed. When all the heavy-load processing units have completed the data processing, the data synthesizing unit reads the code data out of the memory and outputs a sequence of synthesized code data, which is substantially the same as code data obtained when a single heavy-load processing unit is used. Accordingly, the reliability of the heavy-load operations can be guaranteed, while greatly reducing the processing time.

Alternatively, the data synthesizing unit may directly read the data from multiple registers, each of which temporarily stores the associated group of data having been subjected to the heavy-load operations, to output a sequence of code data. This arrangement can further reduce the time required for the heavy-load process. The adjustment between the heavy-load processing time and the ordinary processing time can also be facilitated.

For example, the heavy-load process treats the data on the bit-data basis, while the other ordinary processes treat the data on the data block basis. The multiple heavy-load processing units arranged in parallel to each other can quickly deal with the bit-data based operations.

The image processing apparatus in which the parallel data processor is introduced is, for example, a JPEG 2000 imaging apparatus. In this case, multiple coefficient modeling and MQ coding units are arranged as the heavy-load processing units in parallel to each other in the parallel signal processor. Accordingly, the processing time of the coefficient modeling and MQ coding operation can be consistent with the processing time of, for example, the quantization process.

This invention claimed is:

1. An image processing apparatus with a heavy-load processing part that carries out a heavy-load operation requiring a longer processing time as compared with other ordinary processing parts, the imaging processing apparatus comprising:
   a plurality of heavy-load processing units arranged in parallel with each other;
   a data distribution unit configured to distribute quantized image-related data to each of the heavy-load processing units; and
   a data synthesizing unit configured to synthesize multiple data sets output from the heavy-load processing units so as to produce a sequence of heavy-load processed data that is substantially the same as data obtained if a single heavy-load processing unit is employed.

2. The image processing apparatus according to claim 1, wherein the data distribution unit has a memory that stores said image-related data, and the data distribution unit outputs a prescribed-portion of the image-related data stored in the memory to one of the heavy-load processing units.

3. The image processing apparatus according to claim 1, wherein the data distribution unit distributes the image-related data directly to each of the heavy-load processing units based on the amount of a portion of the image-related data corresponding to one of the heavy-load processing units.

4. The image processing apparatus according to any one of claims 1 through 3, wherein the data synthesizing unit stores said multiple data sets output from the respective heavy-load processing units in a second memory so that the stored data are substantially the same as data obtained if a single heavy-load processing unit is employed, and wherein when operations of all the heavy-load processing units have been completed, the data synthesizing unit reads and outputs the stored data from the second memory.

5. The image processing apparatus according to any one of claims 1 through 3, wherein the data synthesizing unit has multiple temporary memories, each being provided to store the data set output from one of said multiple heavy-load processing units, and wherein when operations of all the heavy-load processing units have been completed, the data synthesizing unit reads and outputs the data from the temporary memories so that the output data are substantially the same as data obtained if a single heavy-load processing unit is employed in the image processing apparatus.

6. The image processing apparatus according to any one of claims 1 through 3, wherein said other ordinary processing part deals with the image-related data on a data-block basis, while the heavy-load processing units deal with the image-related data on a bit-data basis.

7. The image processing apparatus according to any one of claims 1 through 3, wherein the image processing apparatus is a JPEG 2000 image processing apparatus, and each of said heavy-load processing units carries out coefficient modeling and MQ coding.

8. An image processing apparatus with a heavy-load processing part that carries out a heavy-load operation requiring a longer processing time as compared with other ordinary processing pads, the imaging processing apparatus comprising:
   a plurality of heavy-load processing units arranged in parallel with each other;
   a data distribution unit configured to distribute image-related data to each of the heavy-load processing units; and
   a data synthesizing unit configured to synthesize multiple data sets output from the heavy-load processing units so as to produce a sequence of heavy-load processed data that is substantially the same as data obtained if a single heavy-load processing unit is employed,
   wherein the data synthesizing unit stores said multiple data sets output from the respective heavy-load processing units in a second memory so that the stored data are substantially the same as data obtained if a single heavy-load processing unit is employed, and wherein when operations of all the heavy-load processing units have been completed, the data synthesizing unit reads and outputs the stored data from the second memory.

9. An image processing apparatus with a heavy-load processing part that carries out a heavy-load operation requiring a longer processing time as compared with other ordinary processing parts, the imaging processing apparatus comprising:
   a plurality of heavy-load processing units arranged in parallel with each other; a data distribution unit configured to distribute image-related data to each of the heavy-load processing units; and
   a data synthesizing unit configured to synthesize multiple data sets output from the heavy-load processing units so as to produce a sequence of heavy-load processed data that is substantially the same as data obtained if a single heavy-load processing unit is employed,
   wherein the data synthesizing unit has multiple temporary memories, each being provided to store the data set output from one of said multiple heavy-load processing units, and wherein when operations of all the heavy-load processing units have been completed, the data synthesizing unit reads and outputs the data from the temporary memories so that the output data are substantially the same as data obtained if a single heavy-load processing unit is employed in the image processing apparatus.

10. An image processing apparatus with a heavy-load processing part that carries out a heavy-load operation requiring a longer processing time as compared with other ordinary processing pans, the imaging processing apparatus comprising:

a plurality of heavy-load processing units arranged in parallel with each other;

a data distribution unit configured to distribute image-related data to each of the heavy-load processing units; and a data synthesizing unit configured to synthesize multiple data sets output from the heavy-load processing units so as to produce a sequence of heavy-load processed data that is substantially the same as data obtained if a single heavy-load processing unit is employed, wherein said other ordinary processing part deals with the image-related data on a data-block basis, while the heavy-load processing units deal with the image-related data on a bit-data basis.

* * * * *